No. 722,428. PATENTED MAR. 10, 1903.
L. H. MARTELL.
BOX FOR PACKING RINGS.
APPLICATION FILED DEC. 5, 1902.
NO MODEL.
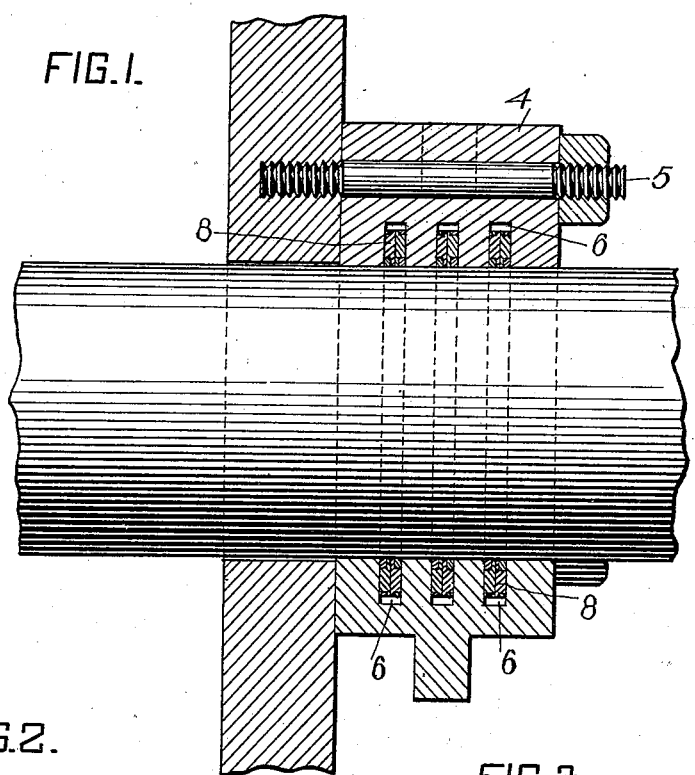
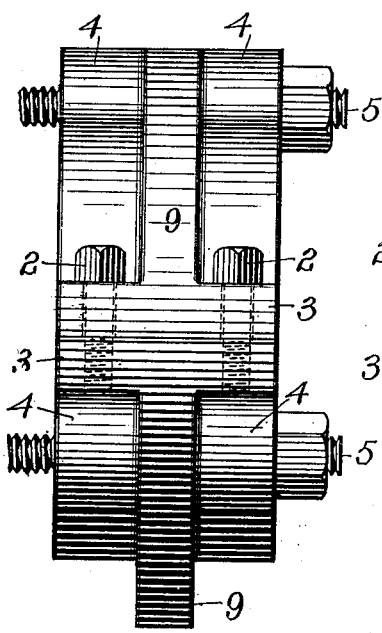
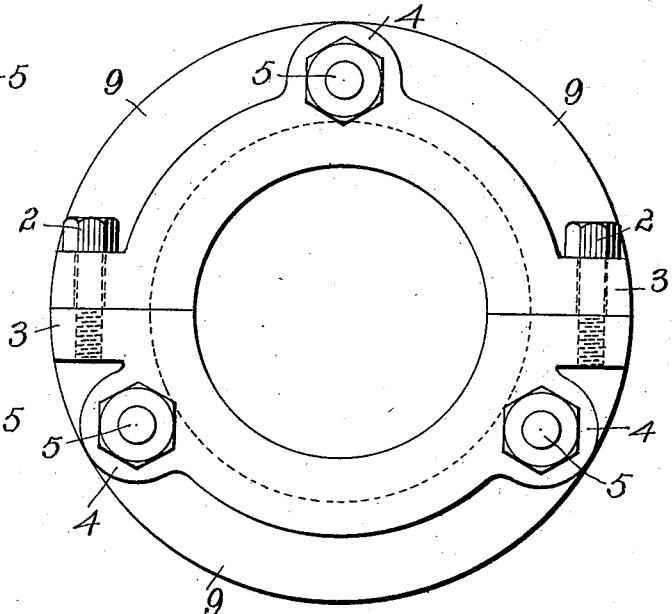
WITNESSES:
INVENTOR

UNITED STATES PATENT OFFICE.

LOUIS H. MARTELL, OF WILKINSBURG, PENNSYLVANIA.

BOX FOR PACKING-RINGS.

SPECIFICATION forming part of Letters Patent No. 722,428, dated March 10, 1903.

Application filed December 5, 1902. Serial No. 134,026. (No model.)

*To all whom it may concern:*

Be it known that I, LOUIS H. MARTELL, a citizen of the United States, residing at Wilkinsburg, in the county of Allegheny and State of Pennsylvania, have invented or discovered certain new and useful Improvements in Boxes for Packing-Rings, of which improvements the following is a specification.

The invention described herein relates to certain improvements in boxes for holding in operative position packing-rings for piston-rods of the type or class forming the subject-matter of an application, Serial No. 121,431, filed by me August 29, 1902.

The invention is hereinafter more fully described and claimed.

In the accompanying drawings, forming a part of this specification, Figure 1 is a sectional view showing my improved box in position on a cylinder-head and the packing-rings in place in the box. Fig. 2 is a side elevation of the box, and Fig. 3 is a plan view of the box.

In the practice of my invention the box is made in two or more sections, adapted to be united by bolts 2 passing through flanges 3, formed at the ends of the sections. The box is provided with ribs 4, two, three, or more in number, parallel with the axis of the box and having holes therethrough for the passage of the studs or bolts 5, whereby the box is secured to the cylinder-head.

In the inner wall of the box are formed grooves 6 for the reception of the packing-rings 8. It has heretofore been customary to make the walls of packing-boxes of this type comparatively thick, so that they would not be seriously weakened by the grooves 6 and the holes for the securing bolts or studs 5. By my improved construction—i. e., forming ribs 4 thereon—the box is strengthened and braced, that the walls thereof may be made comparatively thin. The box is further braced by flanges 9, arranged intermediate of the ends of the box and in a plane at right angles to the axis of the box.

I claim herein as my invention—

A box for packing-rings formed in sections and provided with hollow external ribs and connecting flanges and having internal grooves for the reception of packing-rings, substantially as set forth.

In testimony whereof I have hereunto set my hand.

LOUIS H. MARTELL.

Witnesses:
F. E. GAITHER,
DARWIN S. WOLCOTT.